A. R. BLEWETT.
TRACTOR MACHINE.
APPLICATION FILED APR. 8, 1919.

1,353,945.

Patented Sept. 28, 1920.
2 SHEETS—SHEET 1.

Inventor
Arthur R. Blewett

By
Herbert E. Smith
Attorney

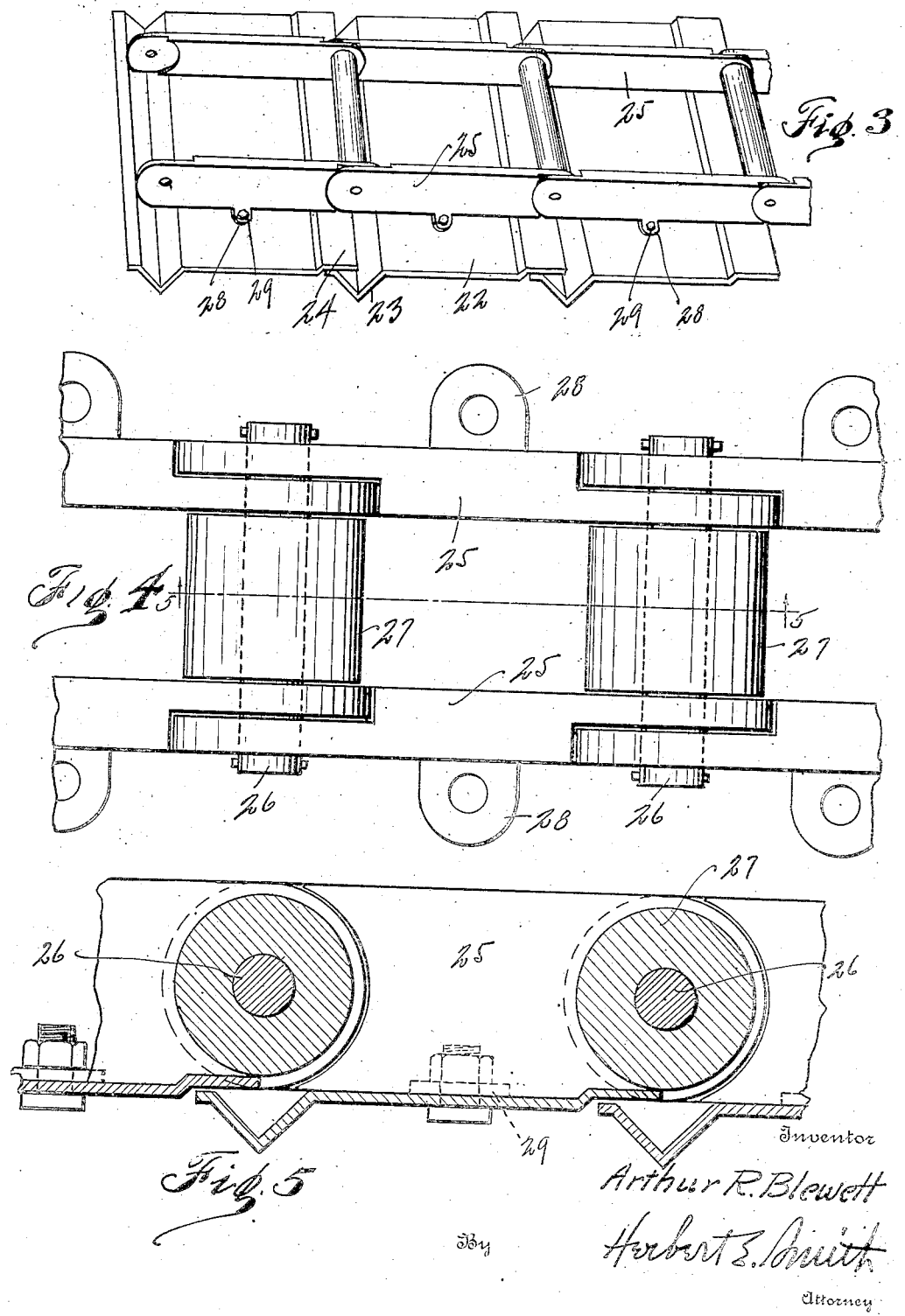

UNITED STATES PATENT OFFICE.

ARTHUR R. BLEWETT, OF PORTLAND, OREGON, ASSIGNOR TO BLEWETT TRACTOR COMPANY, OF TACOMA, WASHINGTON.

TRACTOR-MACHINE.

1,353,945.  Specification of Letters Patent.  Patented Sept. 28, 1920.

Application filed April 8, 1919. Serial No. 288,450.

*To all whom it may concern:*

Be it known that I, ARTHUR R. BLEWETT, a citizen of the United States, residing at Portland, in the county of Multnomah and State of Oregon, have invented certain new and useful Improvements in Tractor-Machines, of which the following is a specification.

My present invention relates to an improved tractor machine, and particularly to the construction of the tractor and its relation to the remainder of the machine, the primary object of the invention being the provision of driving tractors for a machine or vehicle of this character that is flexible, resilient, durable and comparatively strong and at the same time requiring a minimum amount of weight of material.

The invention consists essentially in certain novel combinations and arrangements of parts involving a tractor that is oscillatable on its driving shaft and embodies novel features of construction and combinations of these features as will be pointed out and hereinafter claimed.

In the accompanying drawings one complete example of the physical embodiment of my invention is illustrated, the parts being combined and arranged according to the best mode so far devised for the practical application of the principles of my invention.

The drawings depict the structure sufficiently to indicate that the tractor machine is provided with a forward steering wheel or device and equipped with two lateral tractors, preferably located at the rear of the machine, and one of these tractors, at the left side of the machine, is shown in the drawings, it being understood of course that the complementary tractor at the other side of the machine is of similar construction and operated from the same driving shaft.

Fig. 3 is a perspective view of a portion of the linked driving belt.

Fig. 4 is an enlarged detail view of the sprocket chain forming part of the tractor belt.

Fig. 5 is a sectional view at line 5—5 of Fig. 4.

Figure 1:
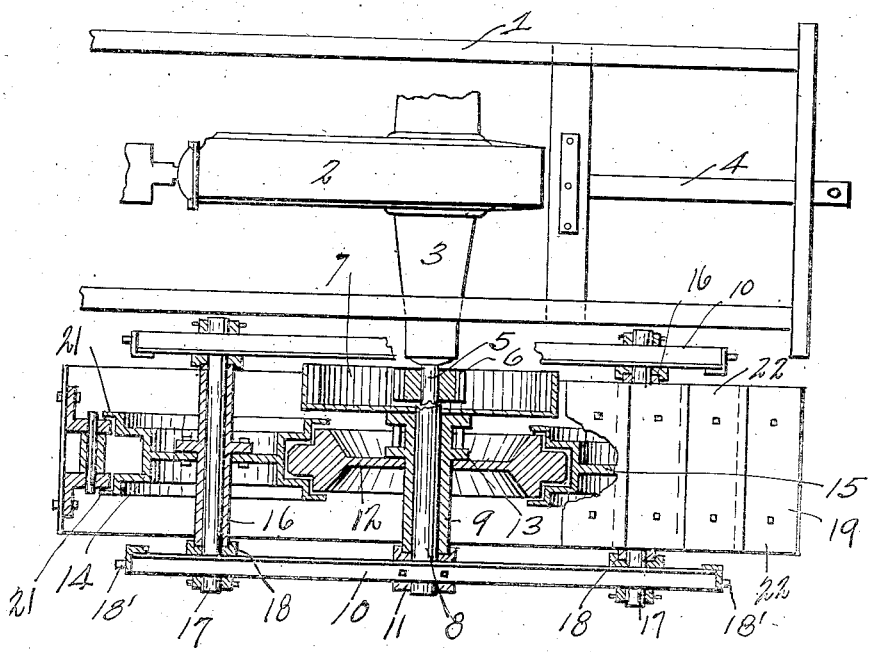
Figure 1 is a plan view of part of the tractor machine, showing one of the tractors partly in section and partly in plan view.

In the preferred form of the invention as shown in the drawings a portion of the rectangular frame 1 is illustrated and the transmission and differential gear casing 2 and driving shaft case 3 are indicated, while a draw bar 4 is coupled at the rear of the frame by which trailers or implements may be hauled.

The driving shaft 5 is indicated and provided with a driving pinion 6 which meshes with the internal gear 7, which also forms a portion of the brake device, a friction band, not shown, being wrapped around the outer periphery of the internal gear wheel.

The gear wheel 7 is journaled on the tractor shaft 8, located directly beneath the driving shaft 5, and the wheel is rigidly connected with its hub or sleeve 9 that extends substantially the length of the journal, while the tractor shaft or axle 8 is rigid with and projects from the side of the frame 1 of the machine.

The tractor as a whole is bodily oscillatable on the axle 8 through the instrumentality of the tractor frame 10 which is journaled at 11 on the axle and projects forwardly and rearwardly therefrom for the support of the driving sprocket wheel, 12 bolted to the flange 13 of the hub on sleeve 9, and also for the support of the two belt pulleys 14 and 15. It will be understood that the driving sprocket 12, its hub 9 and the internal gear wheel 7 are rotatable on the axle 8 and that the internal gear is turned through its connection with the pinion 6 on the driving shaft 5.

The pulleys 14 and 15 have grooved peripheries and are spaced with relation to the driving sprocket so that the latter moves through the grooves and the three wheels are thus held in close compact formation and alinement and assist in guiding each other. The grooved pulleys are equipped with wide hubs 16 journaled on the pulley shafts 17, and the latter are supported in bearing boxes 18, adjustable in the tractor frame 10 by means of the screw bar 18' by means of which the pulleys may be adjusted to compensate for and take up wear in the tractor belt which is indicated as a whole by the numeral 19, and which passes over these belt pulleys, being guided by the flanges 21 21 on the pulleys.

The tractor belt is made up of tread plates or shoes 22 pressed from steel and fashioned with integral ribs or transverse cleats 23 that overlap the offset complementary end 24 of the next plate to form a continuous closed joint, and the cleats are positioned so that they occur at the hinge joint in the sprocket chain 25 of the tractor belt.

The links of the sprocket chain are connected by the transverse pins 26 and sleeves 27 are provided on the pins for engagement by the sprocket teeth of the driving sprocket 12, which, it should be noted, engages both the upper stretch and the lower stretch of the tractor belt, thus tending to reduce frictional engagement with consequent wear to impair the durability of the tractor. The links of the sprocket chain have perforated side lugs 28 at the outer sides of the chain and by means of bolts 29 the tread plates or shoes 22 are securely and firmly attached to the chain, and the chain is guided through its links which pass around the grooved pulleys between the flanges 21 of the pulleys, as seen in Fig. 1.

Figure 2:
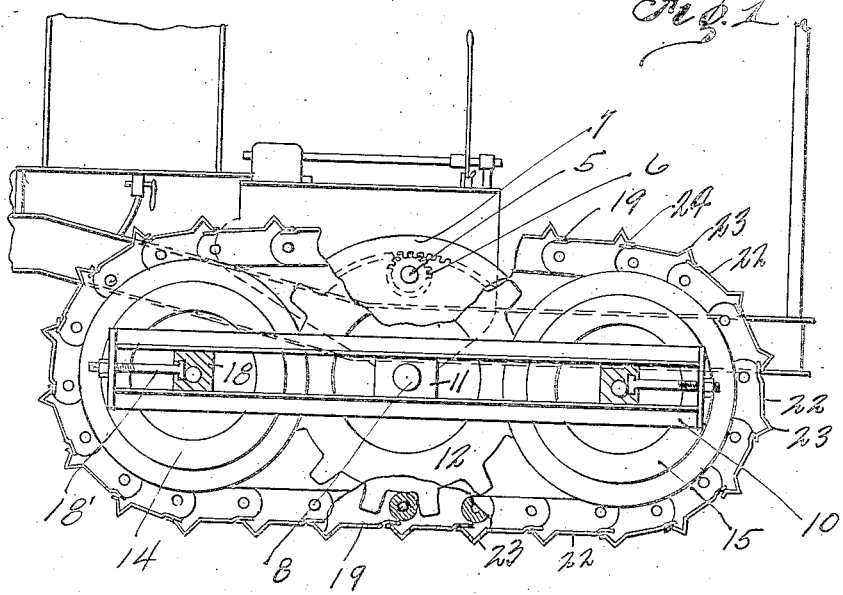
Fig. 2 is a side elevation of the tractor in Fig. 1, partly broken away for convenience of illustration.

In Fig. 2 it will be seen that a long tread is accomplished, between the axes of the two pulleys, and a maximum tractive force is applied, through the ground engaging projections or cleats of the tread plates, between the two pulleys, the engagement of the belt with the ground being assisted in by the central driving sprocket, and thus, the three compactly arranged wheels support the belt and cause effective traction with the ground.

The position of the ground engaging ribs or cleats of the tread plates, directly beneath the sprocket chain joints, insures against buckling or bending of the plates when traveling over hard ground, as it will readily be apparent that the weight of the load is received by the cleats themselves and the strain on the plate between the cleats is comparatively slight.

The construction of the tractor which permits it to oscillate on the axle 8 adapts it to travel over rough ground, even passing over logs and other obstacles without elevating the machine or the steering wheel from the ground, thus insuring that the steering wheel may at all times be in position to perform its functions in guiding the machine. The long tread of the tractor and the manner of directly imposing the weight of the tractor, through the wheels, on the belt, or upon the lower stretch of the belt eliminates or greatly reduces the wear in the belt joints, for it will readily be seen that as the links receive power from the driving sprocket there is comparatively little pull against the joints of the track.

By utilizing the brake band of the internal gear, one tractor may be stopped or retarded to enable the machine to turn abruptly, in which case of course the opposite tractor would be operating, and the machine may thus make a shorter turn than could be accomplished with the front steering wheel.

If desired, one of the belt pulleys could be dispensed with to fulfil some requirements, and other similar changes or alterations may be made within the scope of my claims without departing from the spirit of the invention.

What I claim is—

1. The combination with the main frame, the axle shaft and its driven pinion and central rigid supporting axle, a hub on the axle and journal boxes at the ends of the hub, of a tractor frame fixed on said boxes and oscillatable on the axle, bearing boxes at the ends of the frame, and end supporting pulleys journaled in said bearing boxes, an intermediate driving sprocket carried by the hub, and a flexible driving belt supported on the end pulleys and driven by said sprocket.

2. The combination with a main frame, a driving shaft and driven pinion, and a rigid supporting axle, of a tractor frame oscillatable on the axle and comprising pairs of bearing blocks longitudinally adjustable in the ends of the tract or frame, shafts supported in said blocks, supporting pulleys each having a wide hub journaled on said shafts between said blocks, a driving sprocket journaled on the axle between said pulleys, and a tractor belt supported on the end pulleys and driven by said sprocket.

3. The combination with a supporting axle and tractor frame oscillatable thereon, of a driving sprocket journaled on the axle and operating means therefor, shafts each having end journal blocks supported in the frame, a hub on each shaft between the blocks, a pulley fixed on each hub, a tractor belt on the sprocket and pulleys including hinged sprocket chain-links adapted to engage the sprocket, and said pulleys having guide flanges for the sprocket and links of the sprocket chain.

4. The combination with the main frame and fixed axle, of a hub on the axle and a driving sprocket rotatable with the hub, a gear wheel secured to the hub and means for rotating said gear wheel, an oscillatable tractor frame journaled on the end of the axle, adjustable pulley shafts and pulleys carried in the tractor frame and said pulleys grooved to receive the periphery of the driving sprocket, a tractor belt passing over the pulleys and including a sprocket chain engaged by the driving sprocket, and flanges on the pulleys to guide the chain of the tractor belt.

In testimony whereof I affix my signature.

ARTHUR R. BLEWETT.